US010778654B2

(12) United States Patent
Mullen et al.

(10) Patent No.: US 10,778,654 B2
(45) Date of Patent: Sep. 15, 2020

(54) METHOD AND APPARATUS FOR PROTECTING CONFIDENTIAL DATA IN AN OPEN SOFTWARE STACK

(71) Applicant: ARRIS Enterprises LLC, Suwanee, GA (US)

(72) Inventors: Brian D. Mullen, Duluth, GA (US); Alexander Medvinsky, San Diego, CA (US); Tat Keung Chan, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 93 days.

(21) Appl. No.: 15/267,955

(22) Filed: Sep. 16, 2016

(65) Prior Publication Data

US 2018/0083933 A1    Mar. 22, 2018

(51) Int. Cl.
*G06F 21/10* (2013.01)
*H04L 29/06* (2006.01)

(52) U.S. Cl.
CPC .......... *H04L 63/0435* (2013.01); *G06F 21/10* (2013.01); *H04L 63/061* (2013.01)

(58) Field of Classification Search
CPC . H04L 63/061; H04L 63/0435; H04L 63/101; H04L 2463/062; H04L 63/0478; H04L 2463/101; G06F 21/10
See application file for complete search history.

(56) References Cited

U.S. PATENT DOCUMENTS

| | | | | |
|---|---|---|---|---|
| 2004/0088558 A1* | 5/2004 | Candelore | ............ | H04N 7/1675 713/193 |
| 2011/0314271 A1* | 12/2011 | Boccon-Gibod | ... | G06F 21/6218 713/151 |
| 2014/0032932 A1* | 1/2014 | Hiar | ...... | G06F 11/366 713/190 |
| 2014/0108805 A1* | 4/2014 | Smith | ..... | G06F 21/64 713/171 |
| 2015/0326563 A1* | 11/2015 | Chan | ................... | H04L 63/0823 713/172 |
| 2015/0333906 A1* | 11/2015 | Rahman | ..... | G06F 7/58 380/44 |
| 2016/0182472 A1* | 6/2016 | Michiels | ................ | H04L 9/002 713/171 |
| 2017/0012952 A1* | 1/2017 | Cocchi | .................. | H04L 9/3263 |
| 2017/0116393 A1* | 4/2017 | Choi | ....................... | G06F 21/10 |

(Continued)

*Primary Examiner* — Theodore C Parsons
(74) *Attorney, Agent, or Firm* — Chernoff Vilhauer LLP

(57) ABSTRACT

A method is provided for securely providing data for use in a consumer electronics device having a processor performing instructions defined in a software image. The method includes receiving the data encrypted according to a global key, further encrypting the data according to a device-unique hardware key, storing the further encrypted data in a secure memory of the consumer electronics device, providing the global key to a whitebox encoder for encoding according to a base key to generate a whitebox encoded global key, and transmitting the software image to the consumer electronics device for storage in an operating memory of the consumer electronics device, the software image having a whitebox decoder utility corresponding to the whitebox encoder and the whitebox encoded global key.

14 Claims, 13 Drawing Sheets

(56) References Cited

U.S. PATENT DOCUMENTS

2017/0237551 A1* 8/2017 Van Foreest ............ H04L 9/002
  713/189
2017/0302697 A1* 10/2017 Litva ..................... G06F 21/554
2017/0372064 A1* 12/2017 Vandergeest ............ G06F 21/54

* cited by examiner

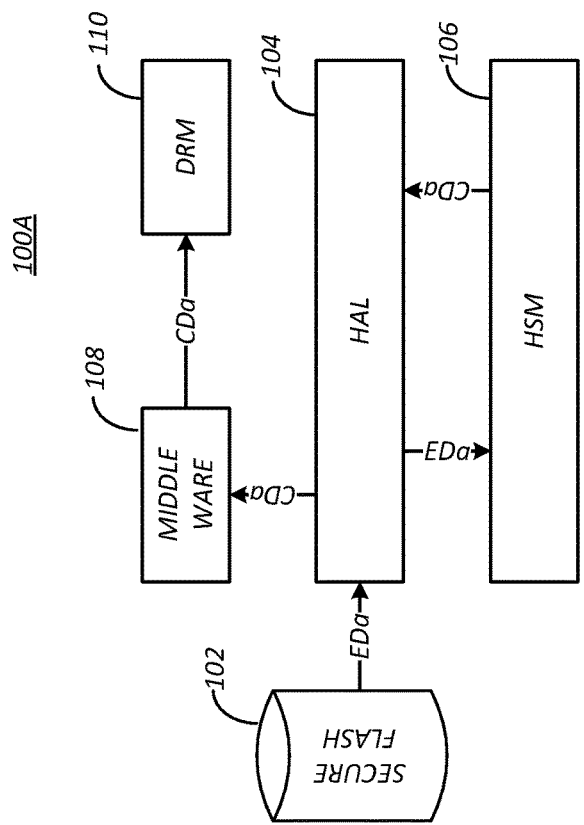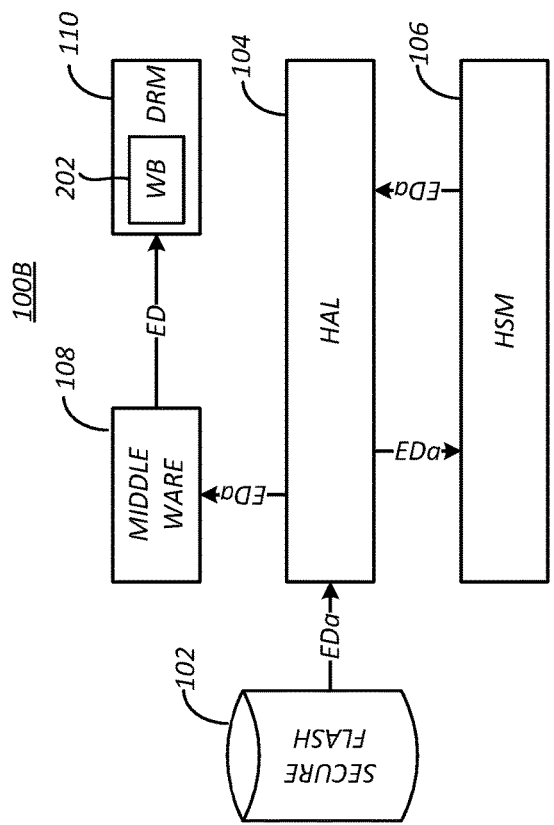

METHOD AND APPARATUS FOR PROTECTING CONFIDENTIAL DATA IN AN OPEN SOFTWARE STACK

BACKGROUND

1. Field of the Invention

The present invention relates to systems and methods for encoding protecting confidential data, and in particular, to systems and methods for protecting confidential data in an open software stack.

2. Description of the Related Art

Open software stacks (OSS) comprise a set of software tools for building and managing cloud computing platforms for public and private clouds. Such software tools can be developed by a number of different organizations. Open software stacks are becoming more common to implement the functionality used in a variety of consumer electronics (CE) devices, including set-top boxes (STBs) that receive and provide subscription television services.

That OSS are developed by multiple organizations poses a problem for CE device manufacturers that intend to use OSS technology in their devices. The problem is rooted in the fact that many different organizations may contribute to the development of the CE device. For example, one organization may develop and produce the system on a chip (SoC) that is used in the CE device, while another organization develops and produces the supporting hardware, and another develops and implements the software used to perform the functions of the CE device. Further, different organizations may contribute software modules that perform different functions within the CE device. For example, digital rights management (DRM) software is typically licensed to the STB manufacturer from another organization. These licenses typically expose the licensee (e.g. the STB manufacturer) to the possibility of litigation in the event that the licensed technology is compromised by one of the non-licensee vendors contributing to the stack. This disclosure details a method that manufacturers can use to ensure that licensed, confidential data is not accessible to non-licensees.

Confidential data can be intercepted by non-licensees in an open stack as the clear confidential data passes through the layers of the stack developed and maintained by non-licensees. This must be prevented to avoid the compromise of this confidential data. For example, a code injection attack may be carried out in the case where a non-licensee only has access to the binary form of a module which handles the clear confidential data. Since the rogue agent does not have access to the code they cannot simply add the code to get a copy of the data. Instead, they intercept the code as it leaves the binary confines of the module by "tricking" the dynamic linker into passing the clear data to a rogue module which would compromise the data before the data reaches its intended destination. This is effectively a code injection style attack.

What is needed is a system and method for hardening devices implementing OSS architecture solutions. This disclosure describes such a system and method.

SUMMARY

To address the requirements described above, a method and system for securely providing data for use in a consumer electronics device having a processor performing instructions defined in a software image is disclosed. In one embodiment, the method comprises receiving the data encrypted according to a global key, further encrypting the data according to a device-unique hardware key, storing the further encrypted data in a secure memory of the consumer electronics device, providing the global key to a whitebox encoder for encoding according to a base key to generate a whitebox encoded global key, and transmitting the software image to the consumer electronics device for storage in an operating memory of the consumer electronics device, the software image having a whitebox decoder utility corresponding to the whitebox encoder and the whitebox encoded global key. In a further embodiment, the method comprises retrieving the stored further encrypted data from the secure memory, decrypting the data according to the device-unique hardware key using the hardware security module, whitebox decoding the decrypted encrypted data using the whitebox decoding utility of the software image and the encoded global key, and providing the decrypted data for use by the software image via an unexternalized software application program interface (API) of the software image such as an unexternalized open software stack. Another embodiment is evidenced by a processor performing instructions stored in a communicatively coupled memory for performing the aforementioned operations.

BRIEF DESCRIPTION OF THE DRAWINGS

Referring now to the drawings in which like reference numbers represent corresponding parts throughout:

FIG. 1 is a top level diagram of a consumer electronics device such as a set top box;

FIG. 2 is a diagram of a modified set top box utilizing a hardened stack that makes use of whitebox technology to ensure that confidential data is propagated through stack only in encrypted form;

DETAILED DESCRIPTION

Figure 3:
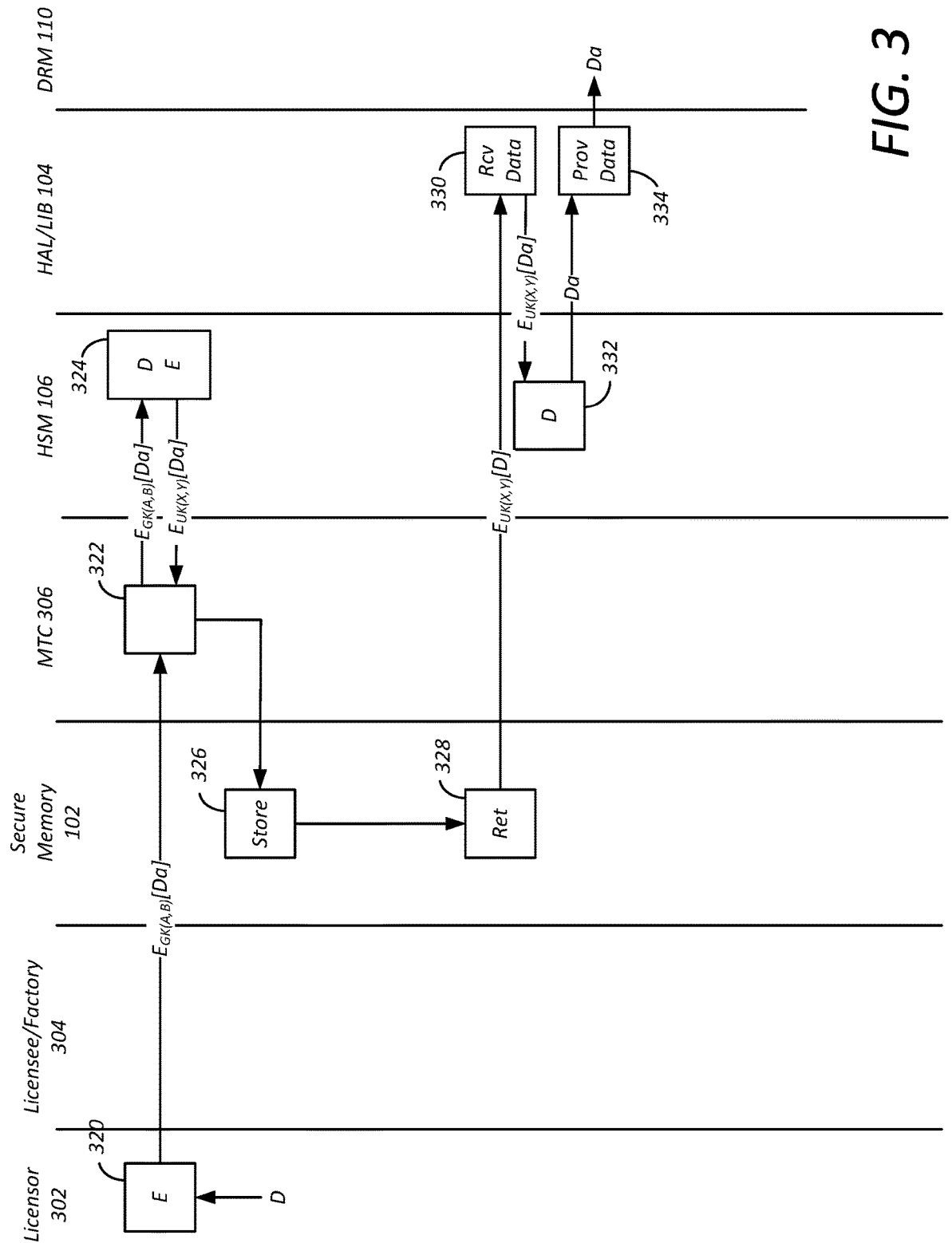
FIG. 3 is a diagram illustrating a typical factory process for storing confidential data in a secure memory of a set top box, and a typical process used by the set top box for retrieving the data.

In the following description, reference is made to the accompanying drawings which form a part hereof, and which is shown, by way of illustration, several embodiments of the present invention. It is understood that other embodiments may be utilized and structural changes may be made without departing from the scope of the present invention.

FIG. 1 is a top level diagram of a CE device such as a set-top box (STB) 100A illustrating how confidential clear data (CDa) can be exposed to non-licensees in typical CE device software. For exemplary purposes, the discussion that follows refers to an STB 100A, however, analogous techniques and systems can be used with any CE device using confidential data. "EDa", as it appears in the FIG. 1, indicates the transfer of encrypted confidential data, while "CDa" indicates the transfer of clear data. Blocks 104-110 represent functional modules which non-licensees have access to, and where they have the potential capability to simply print out the clear confidential data or write it to a file. The arrows between the blocks represent public interfaces which the clear data is passed through which could be exploited via a code injection attack.

Confidential data is stored in the secure flash memory 102 of the STB 100A at the factory. When a fielded STB 100A is operated, confidential data stored in the secure flash 102 is needed to perform the operations of the digital rights management (DRM) module 110.

Confidential data is retrieved from secure memory 102 by the HAL 104 and provided to the hardware security module (HSM) 106 for decryption. Since the confidential data is encrypted, this data is not subject to compromise. The HSM 106 decrypts the confidential data, and provides the decrypted confidential data to the HAL. Since this data is no longer encrypted (it is in the clear), it may be intercepted, thus compromising the confidential data. Further, the HAL 104 provides the confidential data to one or more middleware modules 108, and the middleware modules 108 pass the confidential data to the DRM module 110. Since this data is also passed in the clear, the data is also exposed to compromise when being passed from the HAL 104 to the middleware 108 and from the middleware 108 to the DRM 110.

FIG. 2 is a diagram of a modified STB 100B utilizing a hardened stack that makes use of whitebox technology to ensure that confidential data is propagated through the stack in encrypted form only, in effect, protecting the confidential data from unauthorized access. Hereinafter STB 100A and modified STB 100B are alternately referred to as STB(s) 100.

In this implementation, the confidential data only exists in clear form within the more secure modules (e.g. the HSM 106) which are typically hardware based modules or modules which exist in binary form only. In this solution, the high level modular relationships illustrated in FIG. 2 will reflect the effects of the hardening, and the interfaces are secure. Formerly clear data (CDa) shown in FIG. 1 is instead secure encrypted data (ED). The block labeled "WB" represents a block cipher whitebox decoder implementation which is responsible for decrypting the encrypted data. This whitebox implementation is discussed further below.

In the description that follows, GK(A,B) and GK(C,D) are derived global keys created from combining a root global key with secret pairs A,B and C,D respectively. Similarly, UK(X,Y) refers to derived unit key which has been created by combining a root unit key with a secret pair X and Y. The key derivation method may vary based on the type of hardware security modules used in the CE device. Further, while the following discusses the use of global and unit keys that are derived using a pair of secrets (for example, using key ladder techniques), only one secret input value may be used for such key derivation, or such single input value may be partitioned into two keys.

FIG. 3 is a diagram illustrating a typical factory process for storing confidential data in a secure memory 102 of an STB 100, and a typical process used by the STB 100 for retrieving the data. In block 320, the licensor 302 encrypts the confidential data (Da) according to a global hardware key GK(A, B). The licensor 302 delivers the encrypted confidential data to the licensee (usually after license agreements have been signed and confidential data has been purchased). Before the factory ramps up the line for production of a particular STB 100, the encrypted confidential data is transferred from the licensee server to a factory server (not illustrated) at the factory site. When a STB 100 is being programmed on the manufacturing line, the data is transferred in the GK encrypted form to the STB 100, as shown in block 322. The data is received in the STB 100 by a manufacturing test code (MTC) application 306 running on the STB 100. The MTC 306 provides the GK encrypted confidential data to the HSM 106, which decrypts the GK encrypted data, and re-encrypts the confidential data according to a unit key UK(X,Y)), as shown in block 324. Typically, the encryption with the unit key UK is of greater security than the encryption using the GK key since the unit key encrypted data cannot be copied and utilized on another device. After UK encryption, the encrypted confidential data is passed to the MTC 306 and the MTC 306 writes the re-encrypted data to one-time programmable (OTP) secure flash, as shown in block 326. The particular unit key UK(X,Y) is selected based upon a serial number of the STB 100 or HSM 106 within the STB 100. Typically, this information is provided from the MTC 306 to the factory server and thence to the a server of the licensee.

Following the foregoing operations, a software image is stored in the STB 100. The software image comprises instructions that are used by a processor in the STB 100 to perform STB 100 functions, including those implemented by the DRM module 110.

FIG. 3 also illustrates a typical process used by an STB 100 in retrieving the data for use. In blocks 328 and 330, the HAL 104 retrieves the encrypted confidential data from the secure memory 102. The HAL 104 then provides the encrypted confidential data to the HSM 106. The HSM 106 decrypts the encrypted confidential data, as shown in block 332. This can be done using the UK(X,Y) (e.g. via symmetrical encryption/decryption), or with an associated decryption key paired with UK(X,Y) (e.g. asymmetrical encryption/decryption). The decrypted confidential data is then provided to the DRM module 110.

The difficulty of the operations illustrated in FIG. 3 arises in OSS implementations, because in such implementations, communications between the HAL 104 and the HSM 106 and communications between the HAL 104 and middleware 108 are not secure, and the transmission of confidential data over such interfaces raises the risk of compromising the confidential data.

Figure 4:
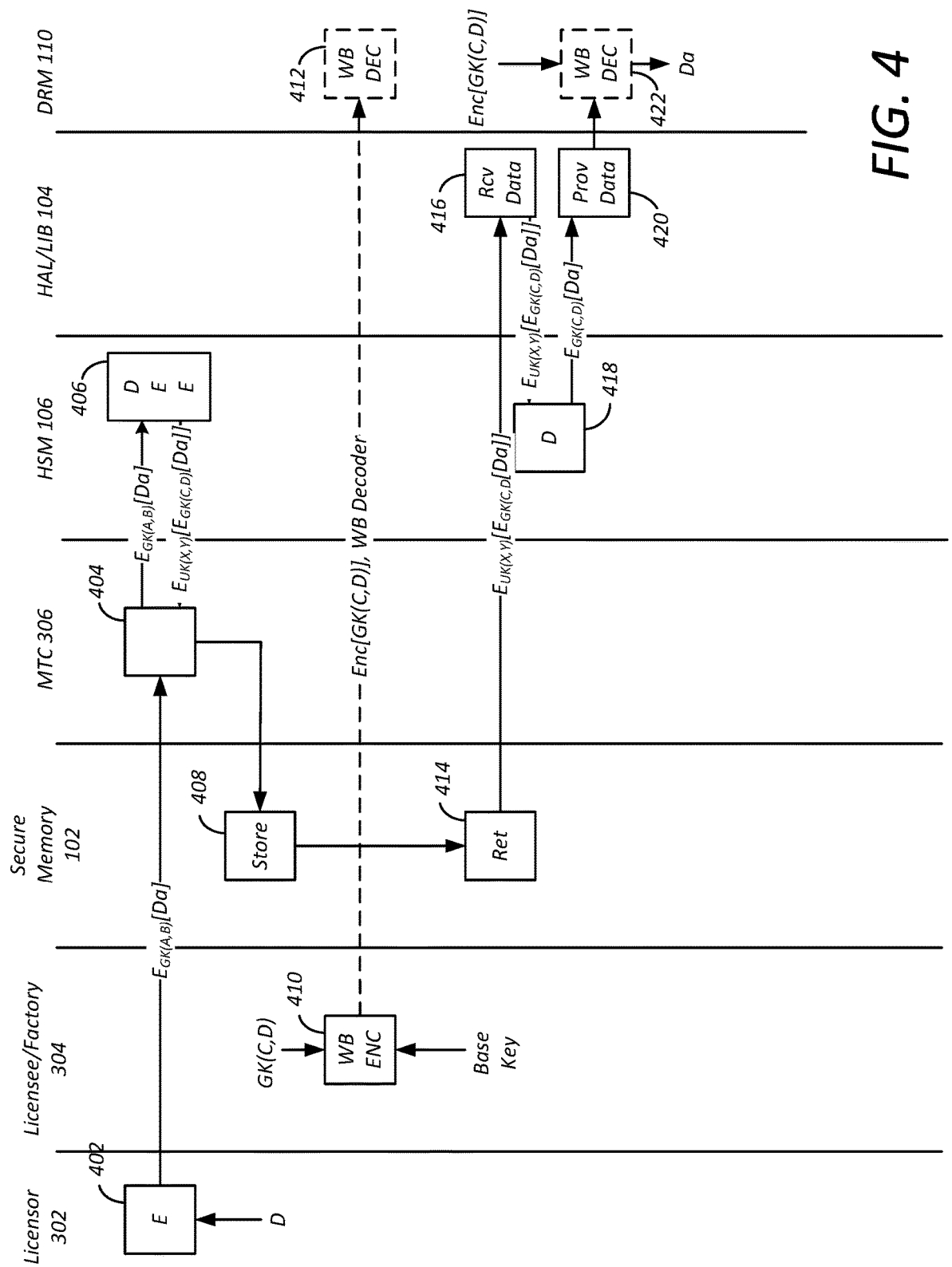
FIG. 4 is a diagram illustrating an improved factory process for storing confidential data in a secure memory of a set top box, and a improved process used by the set top box for retrieving the data.

FIG. 4 is a diagram illustrating a modified factory process for storing confidential data in a secure memory 102 of an STB 100, and a modified process used by the STB 100 for retrieving the data. In block 402, the confidential data (Da) is encrypted according to a global hardware key GK(A,B). In the illustrated embodiment, this is shown as being performed by the licensor, but the licensor 302 typically delivers the encrypted confidential data to the device manufacturer and the device manufacturer performs this encryption. When the STB 100 is being programmed on the manufacturing line, the data is transferred in the GK encrypted form to the STB 100. The data is received in the STB 100 by a manufacturing test code (MTC) application 306 running on the STB 100, as shown in block 404. The MTC 306 provides the GK encrypted confidential data to the HSM 106, which decrypts the GK encrypted data, and re-encrypts the confidential data according to a second global hardware key GK(C,D)), then further encrypts the resulting encrypted confidential data according to a unit key UK(X,Y), as shown in block 406. After UK encryption, the now double-encrypted confidential data is passed to the MTC 306 and the MTC 306 writes the double encrypted data to one-time programmable (OTP) secure flash.

In addition to the foregoing, the licensee 304 encodes the second global hardware key GK(C,D) by use of a whitebox encoder 410, according to a base key, as shown in block 410. This whitebox encoding is further described below. Again, a software image comprising instructions that are used by a processor in the STB 100 to perform STB 100 functions is transmitted to the STB 100 for storage in an operating memory. However, in this case, the transmitted software image includes the whitebox encoded global key and a whitebox decoder utility corresponding to the whitebox encoder, as shown in block 412. This whitebox decoder utility permits the STB 100 to decode the encrypted data without exposing either the data or the second global hardware key GK(C,D), as further described below.

FIG. 4 also illustrates a process used by an STB 100 in retrieving the data for use. In blocks 414 and 416, the HAL 104 retrieves the double encrypted confidential data from the secure memory 102. The HAL 104 then provides the double-encrypted confidential data to the HSM 106. The HSM 106 decrypts the encrypted confidential data to remove the UK(X,Y) associated encryption, as shown in block 418. After this process, the confidential data remains encrypted by the second global hardware key GK(C,D). This encrypted data is then passed to the HAL 104, and from the HAL 104 to the DRM module 110, as shown in block 420. The DRM module 110 includes the whitebox decoder utility that was downloaded with the software image as described above. In block 422, the whitebox decoder utility is used to decrypt the encrypted confidential data.

Note that the primary change to the process is that the confidential data is GK encrypted (with a different key, GK(C,D), than the previous GK used in the process, GK(A, B)) before it is UK encrypted. This GK is the same key which will be encoded into a whitebox cipher implementation. This GK, GK(C,D) may be referred to as GK/WB which indicates that it can be decrypted by the whitebox decoder implementation. Also of note is that the confidential data is being stored in secure flash with double encryption in the modified process as compared to single encryption in the original factory process.

In a further embodiment, the first global hardware key GK(A,B) is identical to the second global hardware key GK(C,D). With this modification, the factory software in the STB 100 only needs to apply the unique encryption with UK(X,Y) on top of the encryption with GK(C,D). Decryption with GK(A,B) and subsequent re-encryption with GK(C,D) would be unnecessary in this case.

Figure 5:
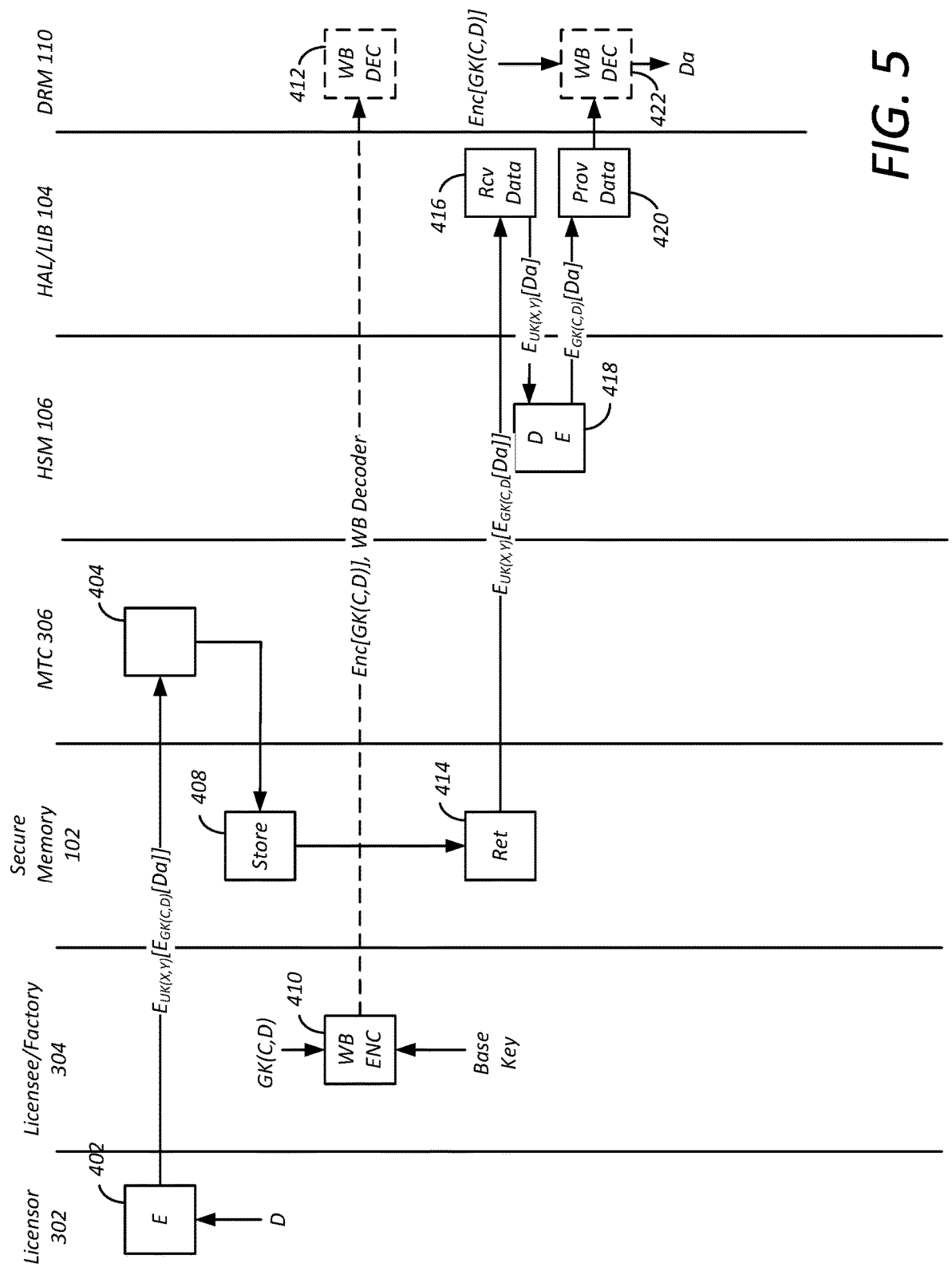
FIG. 5 is a diagram illustrating a further improved factory process for storing confidential data in a secure memory of a set top box, and a further improved process used by the set top box for retrieving the data.

FIG. 5 is a diagram illustrating a further modified factory process for storing confidential data in a secure memory 102 of an STB 100, and a further modified process used by the STB 100 for retrieving the data. In this embodiment, all encryption of the confidential data is accomplished by the Licensor before that confidential data is delivered to the factory. This modified process is more complicated but further improves security of factory provisioning since only globally encrypted confidential data will be present in the factory.

In this modified manufacturing process, the Licensee is able to obtain chip OTP keys from the chip manufacturer. Alternatively, the Licensor originally generates the per-chip unique OTP keys and provides them to the chip manufacturer. In both cases, the Licensor already has the unique per-chip OTP keys and can perform all of the necessary encryption of the confidential data. By the time that confidential data reaches the MTC 306, it is already double-encrypted: first, with the global key GK(C,D) that can be used with a whitebox implementation and then the second time—with a key that is derived from a chip OTP key, UK(X,Y). Accordingly, the confidential data can be stored as is in the STB 100 without the need for any further encryption. The process of decryption and use of the confidential data is the same as illustrated in FIG. 4.

Whitebox Cryptography

In whitebox cryptographic implementations, the key which is used to perform the cryptographic operations with the cipher never exists in a clear form. Since this is the case, a potential attacker can never gain access to the clear key. Instead of using a clear key, a "white box" encoded key is used with the whitebox decoder. In this solution, the key used in the highlighted GK encryption step above is encoded with a whitebox key encoding utility provided to the developers of the STB 100 software stack so that the GB/WB key is included in the root file system of the CE device. The encoded (GK/WB) key can then be retrieved and input to the whitebox. Characteristic of the whitebox implementation include:

1. The whitebox implementation comprises a key encoder and the whitebox cipher or decryptor.
2. Each whitebox implementation is made unique by precompiling the whitebox implementation with a different "base key" than the other whitebox implementations.
3. The key encoder converts clear keys to whitebox encoded keys. An encoded key created from a key encoder built from a particular base key is only compatible with a whitebox cipher built from the same base key.
4. There is a one to one relationship between base key and whitebox implementation. There is a many to one relationship between an encoded key and a whitebox cipher binary. For instance, this method could be implemented by using a single whitebox implementation and different GK/WB keys for each type of licensed data.

5. The forward secrecy property of a cryptographically secure system is realized by this use of the whitebox. As such, if the whitebox is compromised via a code lifting attack, a new whitebox implementation can be built with a different base key which can replace the compromised whitebox on the CE device via a firmware update.

Further details regarding whitebox encoding and decoding can be found in U.S. Pat. No. 8,751,822, issued Jun. 10, 2014 to Lex Anderson, which is hereby incorporated by reference herein.

Hardware Assisted Re-encryption

If the factory process is modified as detailed in the previous section to double encrypt the confidential data with UK and GK encryption, then the UK to GK encryption conversion step on the CE device just consists of a removal of the outer layer of the UK encryption to reveal the GK/WB encryption.

If a specialized hardware security module (HSM) is included with the CE device that can perform the UK to GK encryption, the factory process does not have to include a step that double encrypts the confidential data (the original factory process would still have to be modified if WB encoded keys are to be included in secure flash as will be detailed in a later section).

Figure 6:
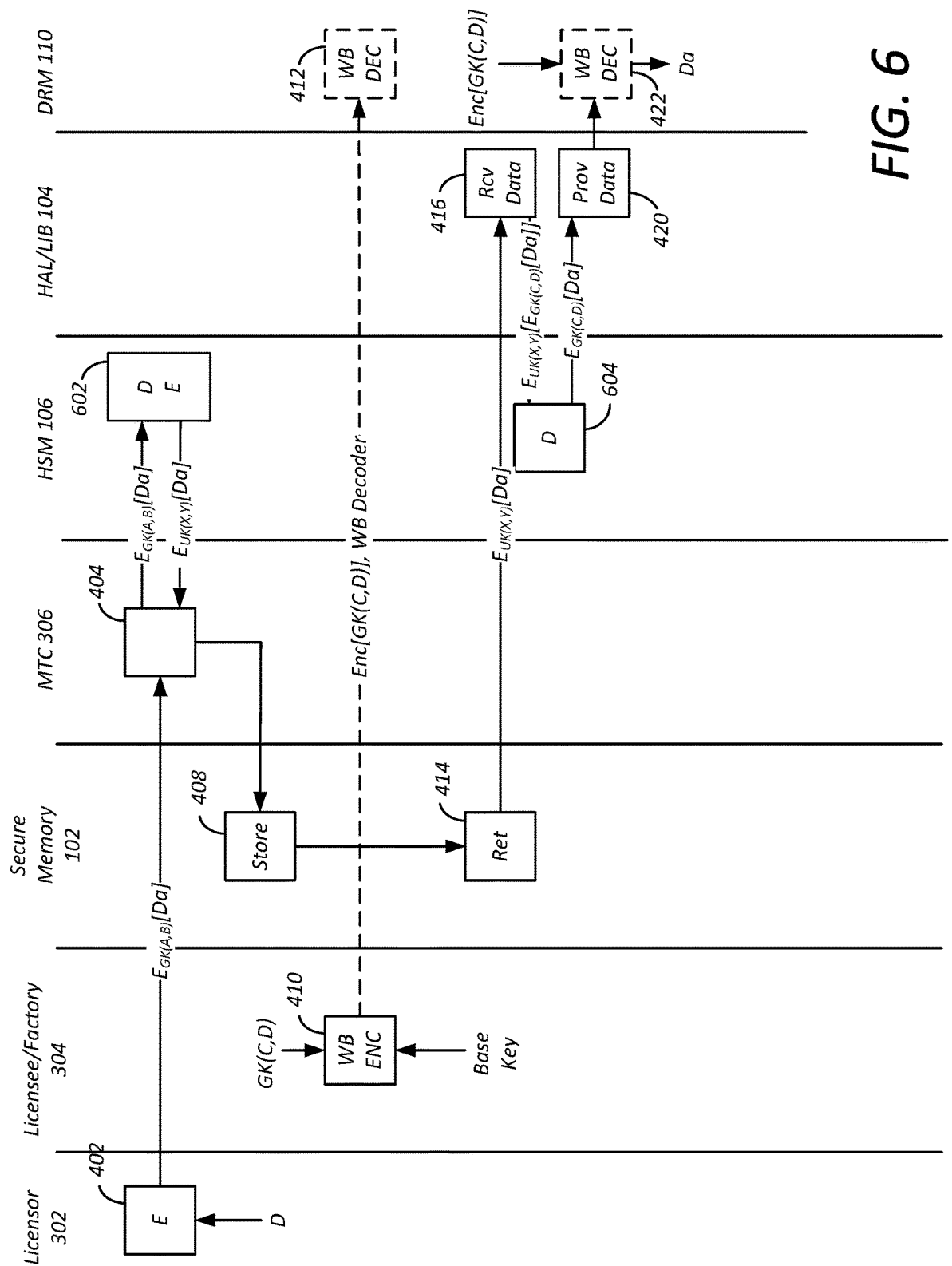
FIG. 6 is a diagram illustrating an implementation with a set top box having a hardware security module capable of internally converting data encrypted with a global unit key to data encrypted only with a whitebox encoded key.

FIG. 6 is a diagram illustrating an implementation with a STB 100 having an HSM 106 capable of internally converting data encrypted with the UK(X,Y) key to data encrypted only with the GK(C,D) (or GK/WB) key.

Figure 7:
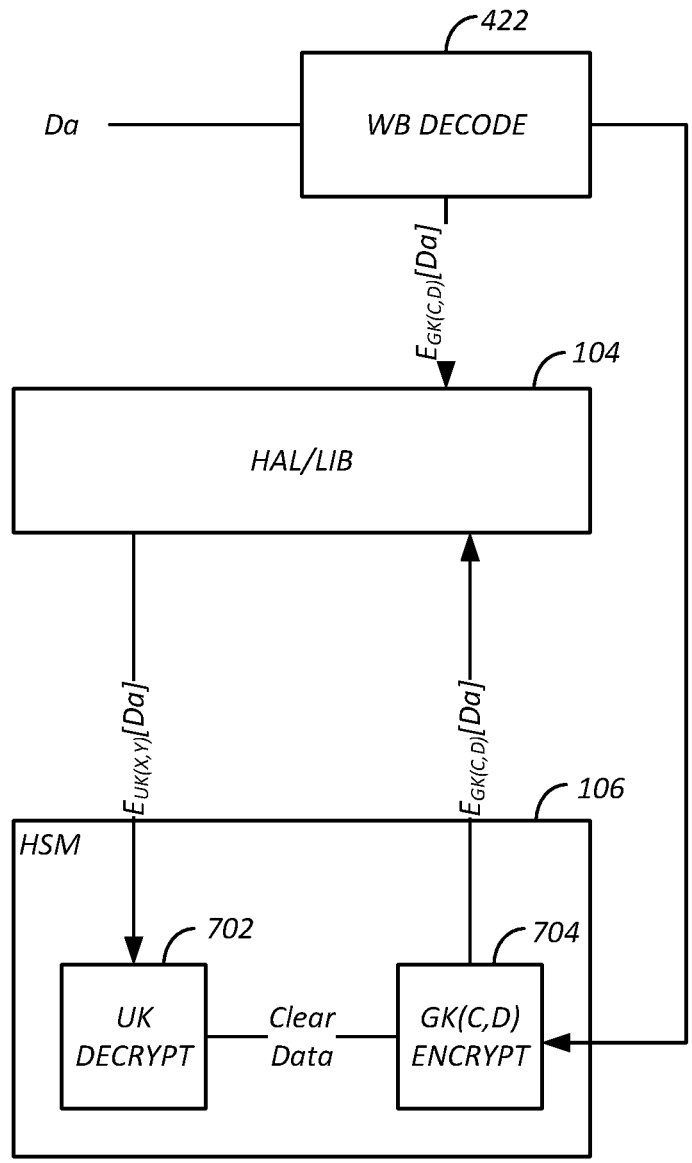
FIG. 7 is a diagram illustrating a hardware security module capable of internally converting data encrypted with the unit key to data encrypted only with the global key.

FIG. 7 is a diagram illustrating an HSM 106 capable of internally converting data encrypted with the UK(X,Y) key to data encrypted only with the GK(C,D) key. The HSM 106 comprises a decryptor 702 for decrypting the UK encrypted confidential data and an encryptor 704 for encrypting the (now clear) confidential data according to the GK(C,D) key. The confidential data is only available in the clear within the (presumably) secure HSM 106, and hence, remains secure.

Returning to FIG. 6, if such an HSM 106 is available, during the factory process, the confidential data encrypted with the global hardware key GK(A,B) need only be decrypted by the HSM 106, then re-encrypted with the unit key UK(X,Y), as shown in block 602. This re-encrypted confidential data is stored in the secure memory 102. When the confidential data is needed by the STB 100, the HAL 104 retrieves the encrypted confidential data, and provides it to the HSM 106, as shown in blocks 414 and 416. As shown in block 604, the HSM decrypts the UK encrypted confidential data and re-encrypts it according to the second global hardware key GK(C,D). This re-encrypted data is provided to the DRM module 110, which can use the whitebox decoder 422 and the encoded second global hardware key GK(C,D) to recover the confidential data.

Figure 8:
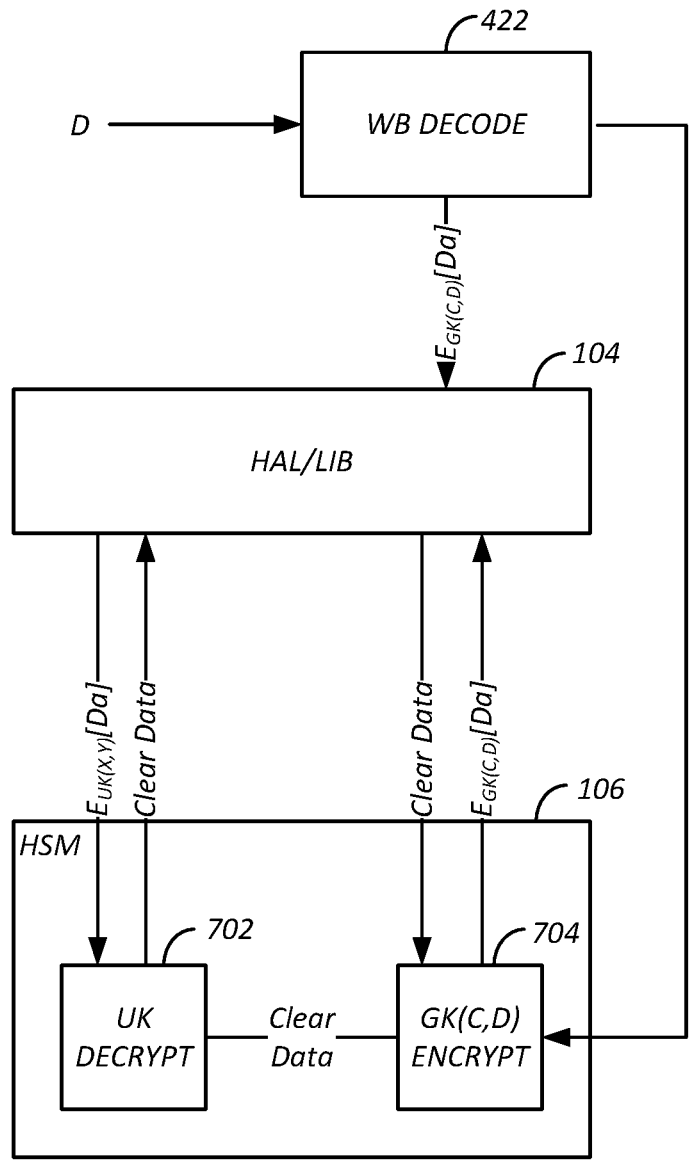
FIG. 8 is a diagram illustrating the drawback of using a commonly supported hardware security module to perform re-encryption.

FIG. 8 is a diagram illustrating an embodiment using a commonly supported HSM to perform re-encryption. In this embodiment (discussed further below) the confidential data is passed over public interfaces between the HAL 104 and the HSM 106. While this embodiment increases security over the prior art, it remains somewhat vulnerable to a code injection style attack to intercept the clear data as it is passed to or from the HSM module 106.

Applications

The foregoing techniques can be used to protect licensed DTCP-IP confidential data in an open stack known as Reference Design Kit (RDK). The RDK is a pre-integrated software bundle that provides a common framework for powering customer-premises equipment (CPE) from TV service providers, including set-top boxes, gateways, and converged devices.

Digital Transmission Content Protection, or DTCP, is a digital rights management (DRM) technology that restricts "digital home" technologies including DVD players and televisions by encrypting interconnections between devices. In theory this allows the content to be distributed through other devices such as personal computers or portable media players, if they also implement the DTCP standards. DTCP has also been referred to as "5C" content protection, a reference to the five companies who created DTCP. DTCP-IP confidential data may include unique per-device secret keys and/or parameters, public per-device identity information such as device certificates and device identifiers, and/or global secret parameters. Examples of such DTCP-IP confidential data is presented in Table 1 below.

TABLE 1

DTCP-IP Confidential Data

| Digital Transmission Licensing Administrator (DTLA) Data Item | Use |
| --- | --- |
| AES key derivation constants: $C_{A0}$, $C_{B1}$, $C_{B0}$, $C_{C1}$, $C_{C0}$, $C_{D0}$ | Global Constants. DTLA mandated secret. |
| Elliptic Curve Cryptography (ECC) Device Private Key | Unique to each device. DTLA mandated secret. |
| Random Number Generator Seed | Used one time when the device is boot in the factory. DTLA mandated secret |
| IV derivation constant: $IV_C$ | Used as a component of to derive the first IV of a PCP. IVs typically part of the public domain. DTLA mandated secret |
| DTLA Public Key - x and y components | DTLA mandated secret |
| Elliptic Curve Parameters: p, a, b, G, r | DTLA mandated secret |
| Other cert data: device id. Signature, etc. | DLTA public |

Note that the confidential data contains an ECC device private key (DPK). Using a further whitebox implementation, this ECC private key can be converted to a whitebox encoded key in the factory. The DPK can be first converted to white box encoding in addition to double encrypted with UK+GK/WB. The rest of the DTCP-IP data can be stored with UK+GK/WB double encryption without the additional white box transformation. The inner layer of encryption of DPK (GK and WB encoding) can be performed before handing off the data to the factory or MTC 306 which adds the inner layer encryption at the factory.

Figure 9:
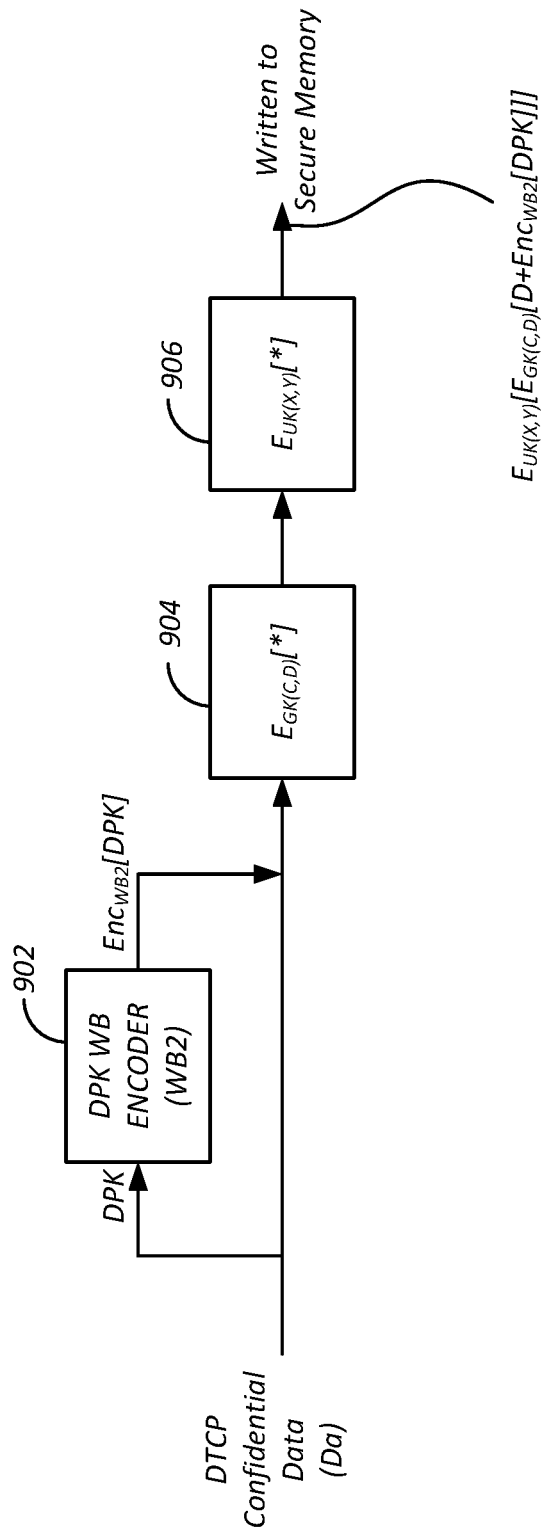
FIG. 9 is a diagram illustrating the process of adding the inner and outer layers of encryption to digital transmission content protection-Internet protocol (DTCP-IP) data in a machine type code (MTC) application on the factory line.

FIG. 9 is a diagram illustrating the process of adding the inner and outer layer encryption to the DTCP-IP data in the MTC application on the factory line. This particular diagram illustrates an embodiment in which the DPK is encoded by encoder 902, encrypted by the GK(C,D) key, then further encrypted by the UK(X,Y) key (effectively triple encrypted), while the remainder of the DTCP-IP data is double encrypted. This double and triple encrypted data is then stored in the secure memory 102.

While Table 1 and FIG. 9 depict DTCP-IP parameters and the use thereof, analogous unique per-device secret keys and parameters, public per-use device identity information such as device digital certificates and device identifiers, as well as global secret parameters may be used.

Figure 10:
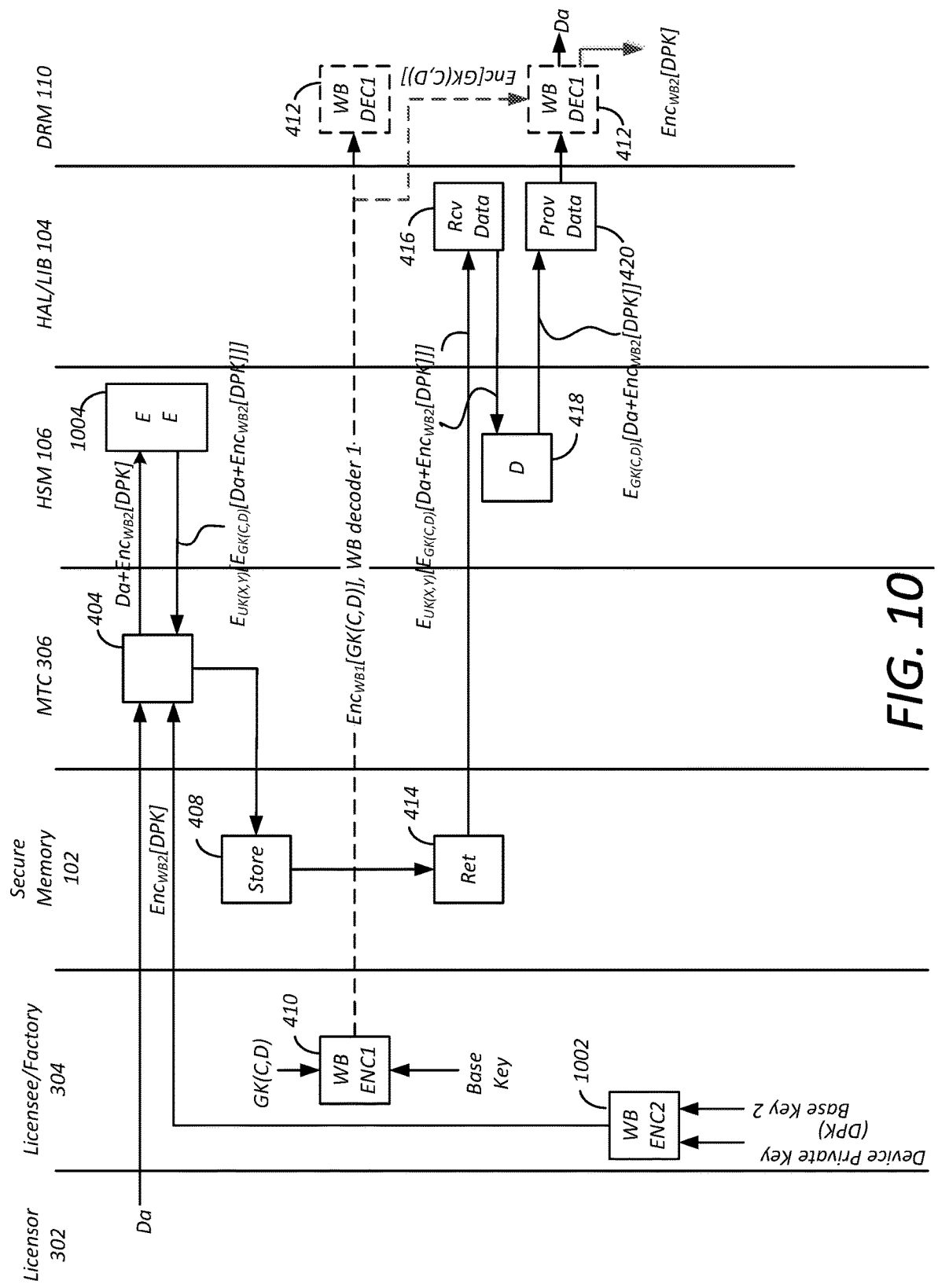
FIG. 10 is a diagram further illustrating the adding of inner and outer layers of encryption to the DTCP-IP data and the use of the data in a fielded set top box.

FIG. 10 is a diagram further illustrating the adding of the inner and outer layer of encryption to the DTCP-IP data and the use of the data in a fielded STB 100. This embodiment is similar to the embodiment depicted in FIG. 4. However, this embodiment includes generation of a whitebox encoded consumer electronics device private key (DPK). The whitebox encoded consumer electronics DPK is generated by providing the DPK to a second whitebox encoder for encoding according to a second base key, as illustrated in block 1002. Although a second base key is used in the illustrated embodiment, the base key used to generate the whitebox encoded DPK in block 1002 may be the same base key used to generate the encoded second global hardware key GK(C, D) as shown in block 410.

The whitebox encoded DPK is provided to the MTC 306, along with the other DTCP-IP confidential data, which forwards the whitebox encoded DPK and other DTCP-IP confidential data to the HSM 106. In the illustrated embodiment, the confidential data is provided from the licensor 302 in unencrypted form (as also illustrated in FIG. 9), hence, the HSM 106 need not decrypt the confidential data provide by the licensor 302. Accordingly, the HSM 106 simply double encrypts the confidential data and the whitebox encoded DPK, as shown in block 1004. In other embodiments, the DPK is white box encoded and then encrypted together with the confidential data according to the first global hardware key GK(A,B) after it is received from the licensor, and is decrypted by the HSM 106 before the double encryption process. The double encrypted confidential data and encoded DPK are then provided to the MTC 306, which stores the double encrypted confidential data and encoded DPK in the secure memory 102.

Again, a software image comprising instructions that are used by a processor in the STB 100 to perform STB 100 functions is transmitted to the STB 100 for storage in an operating memory. As before, this transmitted software image includes the whitebox encoded global key GK(C,D) and the first whitebox decoder utility 412 corresponding to the first whitebox encoder 410, as shown in block 412.

FIG. 10 also illustrates a process used by an STB 100 in retrieving the data for use. In blocks 414 and 416, the HAL 104 retrieves the double encrypted confidential data from the secure memory 102. The HAL 104 then provides the double-encrypted confidential data to the HSM 106. The HSM 106 decrypts the encrypted confidential data to remove the UK(X,Y) associated encryption, as shown in block 418. After this process, the confidential data remains encrypted by the second global hardware key GK(C,D). This encrypted data is then passed to the HAL 104, and from the HAL 104 to the DRM module 110, as shown in block 420. The DRM module 110 includes the whitebox decoder utility 412 that was downloaded with the software image as described above. This whitebox decoder utility 412 accepts the confidential data Da and the whitebox encrypted DPK (both encrypted by the global key GK(C,D), as well as the whitebox encrypted global key GK(C,D), decrypts the whitebox encrypted global key GK(C,D) to provide the global key GK(C,D), and uses the decrypted global key GK(C,D) to decrypt the confidential data Da and the whitebox encrypted DPK, thus making the confidential data Da and the whitebox encrypted DPK available.

The foregoing process is analogous to the process depicted in FIG. 4. However, the encoded DPK is used in that form by a special white box crypto library that can use a white box encoded key. For example, in the case of DTCP-IP, DPK is an Elliptic Curve key and it is used in a special white box Elliptic Curve library.

Figure 11:
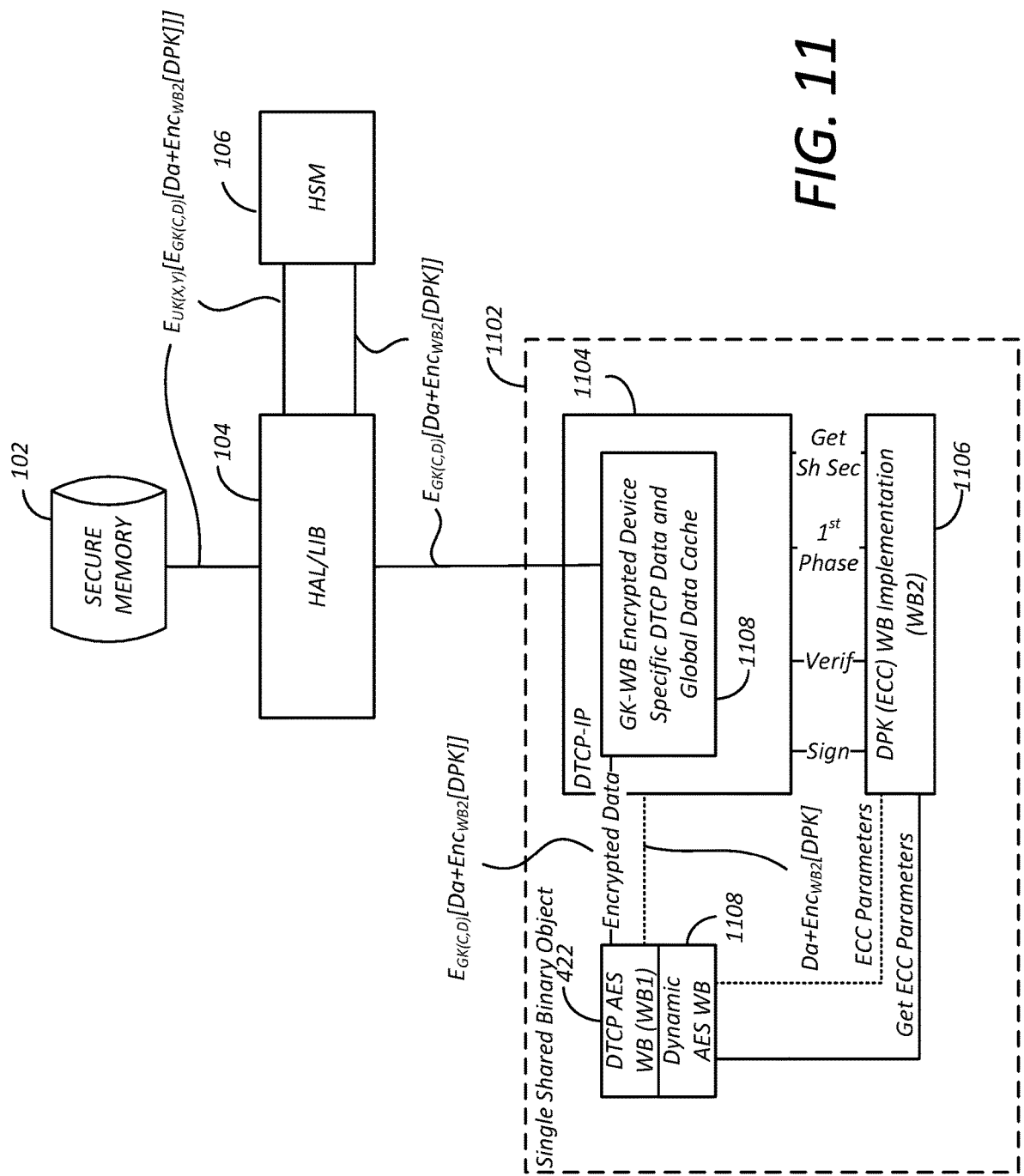
FIG. 11 is a diagram further illustrating the operations performed in retrieving the confidential DTCP-IP data for use.

FIG. 11 is a diagram further illustrating the operations performed in retrieving the confidential DTCP-IP data for use. When the DTCP-IP stack starts, all of the DTCP-IP confidential data is loaded. The task of loading the data involves reading it out of secure memory 102 such as secure flash (PFD), providing the encrypted data to the HSM 106, using the HSM 106 to remove the layer of UK encryption, and then passing the data via the HAL 104 up the stack to the DCTP-IP module 1104 where the data is decrypted and used.

The encrypted data is passed to a first whitebox decoder 422 (e.g. the DTCP AES WB decryptor), which decrypts the encrypted data to recover the encrypted confidential data Da and the encoded DPK key, which are passed back to the DTCP-IP module 1104 for storage in the GK-WB encrypted device specific DTCP Data and Global Data Cache 1108. The DTCP-IP module 1104 passes the encoded DPK key to whitebox crypto library that works with the white box encoded keys (e.g. the DPK (ECC) WP Implementation). The whitebox crypto library 1106 uses the whitebox encoded DPK along with ECC parameters to perform cryptographic operations such as Elliptic Curve Digital Signature Algorithm (ECDSA) and Elliptic Curve Diffie-Hellman (ECDH) in the case of DTCP-IP.

In order to be resilient against code injection attacks, the foregoing avoids passing any clear data across public interfaces (although clear data is passed within non-public interfaces, as shown by the dashed lines). Such clear data may be provided in response to cryptographic operations that are part of the DTCP-IP protocol using secret values protected inside the device. For example, in the illustrated embodiment, the device has a randomly generated ECDH public/private key pair (Ydev, Xdev) and another device communicating with this device has its own ECDH public/private keypair (Yother, Xother). The "$1^{st}$ phase" refers to the operation "Get 1st Phase value," which is a mathematical ECDH computation in which the device computes its public key Ydev from private key Xdev (Ydev=Xdev*G), where G is an Elliptic Curve global parameter called "Generation Point" or also called "Base Point". It is one of the global secret DTCP-IP parameters that a device needs to protect. Further, "Get Shared Secret" refers to an operation to retrieve the Shared Secret=Xdev*Yother, where Xdev is the ECDH private key of the device and Yother is the ECDH public key of the other communicating device. For both operations, '*' is a special "Elliptic Curve multiply" operation that is understood by experts in Elliptic Curve cryptography.

The whitebox(es) are modules that have interfaces that handle (or produce) clear data (e.g. the presentation of the decrypted confidential data on a decrypt interface) so this interface is not exposed to the library linker by externalizing its interfaces in a shared library object (e.g. making those interfaces available external to the external entities). To make the interfaces with the whitebox(es) private and unlinkable, the whitebox module(s) are only statically linked to modules which depend on it (e.g. require data from the associated whitebox for operation. In the illustrated case, the DTCP-IP stack is the only module dependent on the whitebox(es) so the whitebox(es) are included in the same binary object as the DTCP-IP RDK compliant stack, as illustrated in FIG. 11. In particular, the use of two whiteboxes is illustrated: an AES whitebox (WB1) 1108 and a ECC or DPK whitebox (WB2) 1106.

Post Production Updates

A situation may arise where an STB 100 or other device which has already been fielded with a closed-source software stack is field-upgraded to a version of firmware which is based on an open software stack. In this scenario, the STB 100 was manufactured in a fashion where the confidential data in secure flash is only single encrypted as detailed in the non-modified factory process in the "Factory Process" illustrated in FIG. 3. Unexpected to the designers of the STB 100, an open source stack is loaded in the OTP flash memory of the STB 100 at some point in the device's post-production future which exposes the licensee to the risk of disclosing confidential data. Since the device's one-time-programmable (OTP) secure flash data has already been programmed in the factory, and since reprogramming OTP data is not an option, implementing a solution that leverages the modified factory process as detailed in FIG. 4, which utilizes double encryption of the confidential in secure flash with a GK-WB key is not possible.

However, the licensee mitigates the risks realized when an open source stack is loaded on a device which was manufactured with the non-modified factory process illustrated in FIG. 3. Solutions vary based on some characteristics of the device (e.g. the amount of free flash space available on the device and the presence of an HSM which supports the functionality described in the above "Hardware Assisted Re-encryption" discussion. The goal of any solution is to minimize access to confidential data outside of licensee controlled software modules.

Turning first to the case where the STB 100 contains support for "Hardware Assisted Re-encryption" as in FIG. 7 (although few devices currently have the capability to perform hardware assisted re-encryption). In this case, the licensee's controlled SW modules in the open source stack could leverage the HSM 106 for the purpose of decrypting the UK encrypted data and re-encrypting the data with the GK-WB key in a single pass through secure hardware (the HSM 106) so that the confidential data never exists in the clear outside of HSM 106 as contrasted to the case where this is done with a device which does not support HSM re-encryption as detailed in FIG. 8. In the context of DTCP-IP, this solution isn't as secure as the solution in FIG. 10 because the STB 100 is not provided with a pre-WB-encoded ECC DPK. Specifically, the confidential data is in the clear when passed from the first whitebox decoder (W1) 422 to the DTCP-IP module, and again with communications between the DTCP-IP module 1104 and the BLM ECC implementation 1208. Thus, leveraging the use of an ECC WB implementation is not possible without WB encoding the ECC private key on the STB 100. To clarify, the use of a pre-WB-encoded ECC private key in conjunction with an ECC WB implementation facilitated the ability to carry out ECC functions without ever exposing the ECC DPK in the clear, effectively achieving computational secrecy in protecting the ECC DPK.

Figure 12:
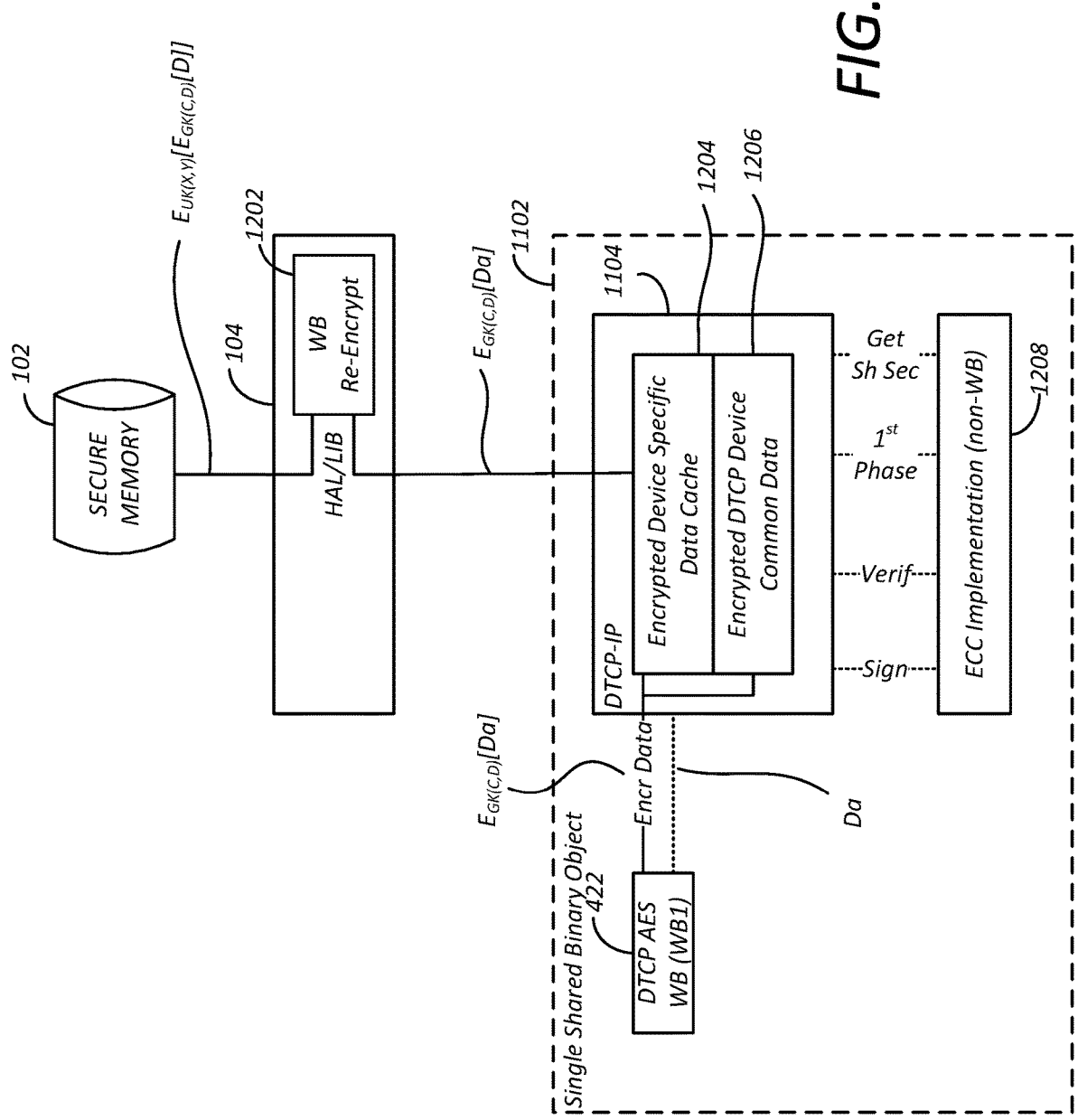
FIG. 12 is a diagram presenting another embodiment of how confidential DTCP-IP data may be securely retrieved for use.

FIG. 12 is a diagram presenting another embodiment of how confidential DTCP-IP data may be securely retrieved for use. This embodiment does not require an HSM 106 capable of decrypting the confidential data using the UK key and re-encrypting the data using the GK(C,D) key in a single pass (e.g. without exposing clear data to the HAL 104 as described above). In this embodiment, it is presumed that the STB 100 has ample flash capacity to allow the firmware image, based on an open stack (RDK), to increase in size. A particular device which fits these criteria can be used to achieve the goal of minimizing access to confidential data outside of licensee controlled software modules to a degree nearly equal to previous implementation which utilized the single-pass HSM re-encrypt functionality. In this solution, the single-pass HSM re-encrypt functionality is replaced by a re-encrypt block implemented with an AES whitebox 1202. Further, the DCTP-IP module 1104 includes encrypted device-specific data cache 1204 and encrypted DTCP device common data 1206.

The embodiment depicted in FIG. 12 includes two whitebox implementations (WB Re-encrypt 1202 and DTCP AES WB 422) which are built into two separate binary objects (MFR LIB and DTCP-IP library).

Hardware Environment

Figure 13:
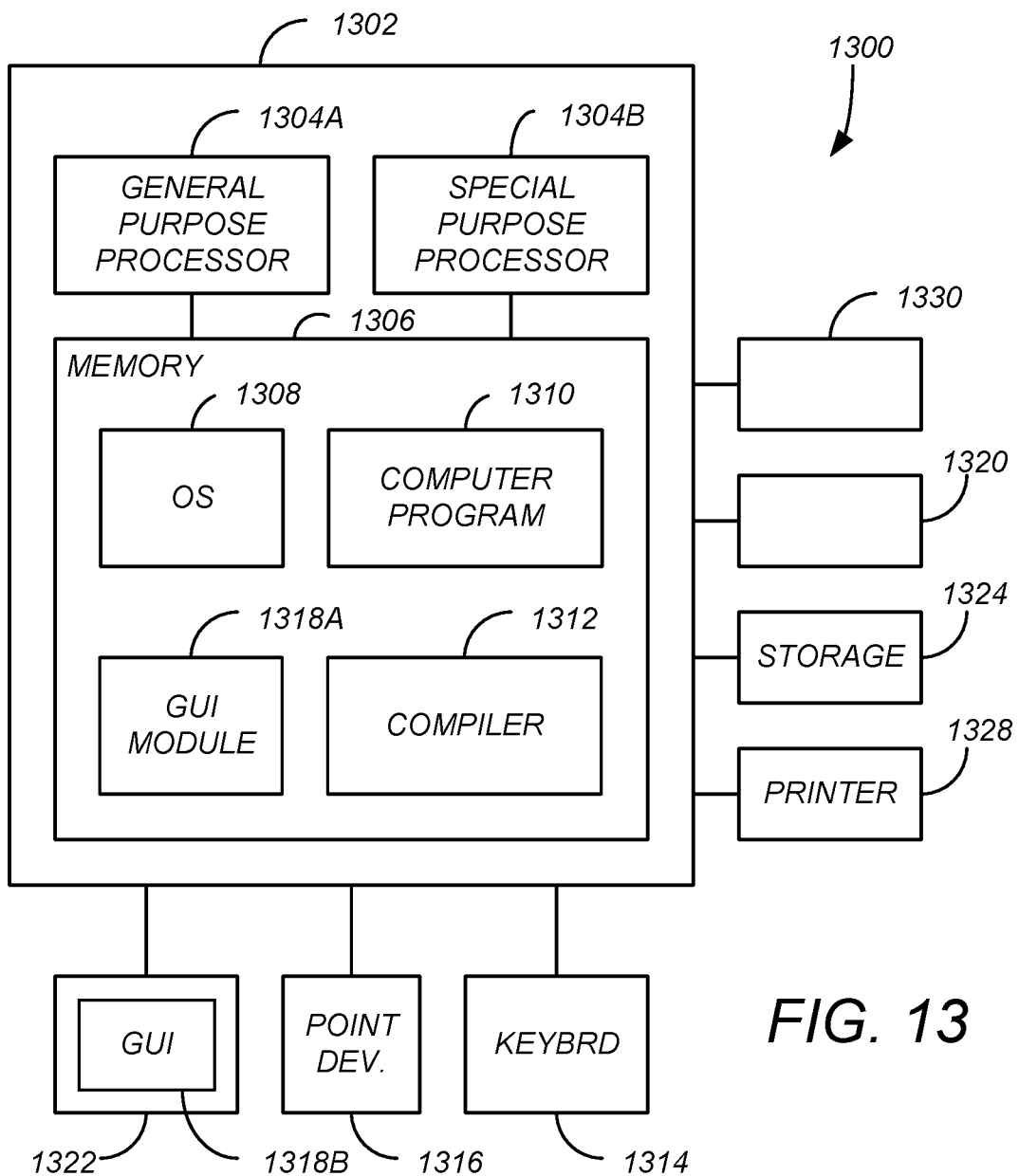
FIG. 13 is a diagram illustrating an exemplary computer system that could be used to implement elements of the present invention.

FIG. 13 is a diagram illustrating an exemplary computer system 1300 that could be used to implement elements of the present invention, including a computer for performing the operations performed by the licensor 302, or the licensee 304.

The computer 1302 comprises a general purpose hardware processor 1304A and/or a special purpose hardware processor 1304B (hereinafter alternatively collectively referred to as processor 1304) and a memory 1306, such as random access memory (RAM). The computer 1302 may be coupled to other devices, including input/output (I/O) devices such as a keyboard 1314, a mouse device 1316 and a printer 1328.

In one embodiment, the computer 1302 operates by the general purpose processor 1304A performing instructions defined by the computer program 1310 under control of an operating system 1308. The computer program 1310 and/or the operating system 1308 may be stored in the memory 1306 and may interface with the user and/or other devices to accept input and commands and, based on such input and commands and the instructions defined by the computer program 1310 and operating system 1308 to provide output and results.

Output/results may be presented on the display 1322 or provided to another device for presentation or further processing or action. In one embodiment, the display 1322 comprises a liquid crystal display (LCD) having a plurality of separately addressable pixels formed by liquid crystals. Each pixel of the display 1322 changes to an opaque or translucent state to form a part of the image on the display in response to the data or information generated by the processor 1304 from the application of the instructions of the computer program 1310 and/or operating system 1308 to the input and commands. Other display 1322 types also include picture elements that change state in order to create the image presented on the display 1322. The image may be provided through a graphical user interface (GUI) module 1318A. Although the GUI module 1318A is depicted as a separate module, the instructions performing the GUI functions can be resident or distributed in the operating system 1308, the computer program 1310, or implemented with special purpose memory and processors.

Some or all of the operations performed by the computer 1302 according to the computer program 1310 instructions may be implemented in a special purpose processor 1304B. In this embodiment, some or all of the computer program 1310 instructions may be implemented via firmware instructions stored in a read only memory (ROM), a programmable read only memory (PROM) or flash memory within the special purpose processor 1304B or in memory 1306. The special purpose processor 1304B may also be hardwired through circuit design to perform some or all of the operations to implement the present invention. Further, the special purpose processor 1304B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1302 may also implement a compiler 1312 which allows an application program 1310 written in a programming language such as COBOL, C++, FORTRAN, or other language to be translated into processor 1304 readable code. After completion, the application or computer program 1310 accesses and manipulates data accepted from I/O devices and stored in the memory 1306 of the computer 1302 using the relationships and logic that was generated using the compiler 1312.

The computer 1302 also optionally comprises an external communication device such as a modem, satellite link, Ethernet card, or other device for accepting input from and providing output to other computers.

In one embodiment, instructions implementing the operating system 1308, the computer program 1310, and/or the compiler 1312 are tangibly embodied in a computer-readable medium, e.g., data storage device 1320, which could include one or more fixed or removable data storage devices, such as a zip drive, floppy disc drive 1324, hard drive, CD-ROM drive, tape drive, or a flash drive. Further, the operating system 1308 and the computer program 1310 are comprised of computer program instructions which, when accessed, read and executed by the computer 1302, causes the computer 1302 to perform the steps necessary to implement and/or use the present invention or to load the program of instructions into a memory, thus creating a special purpose data structure causing the computer to operate as a specially programmed computer executing the method steps described herein. Computer program 1310 and/or operating instructions may also be tangibly embodied in memory 1306 and/or data communications devices 1330, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1302.

Although the term "computer" is referred to herein, it is understood that the computer may include portable devices such as cellphones, portable MP3 players, video game consoles, notebook computers, pocket computers, or any other device with suitable processing, communication, and input/output capability.

Figure 14:
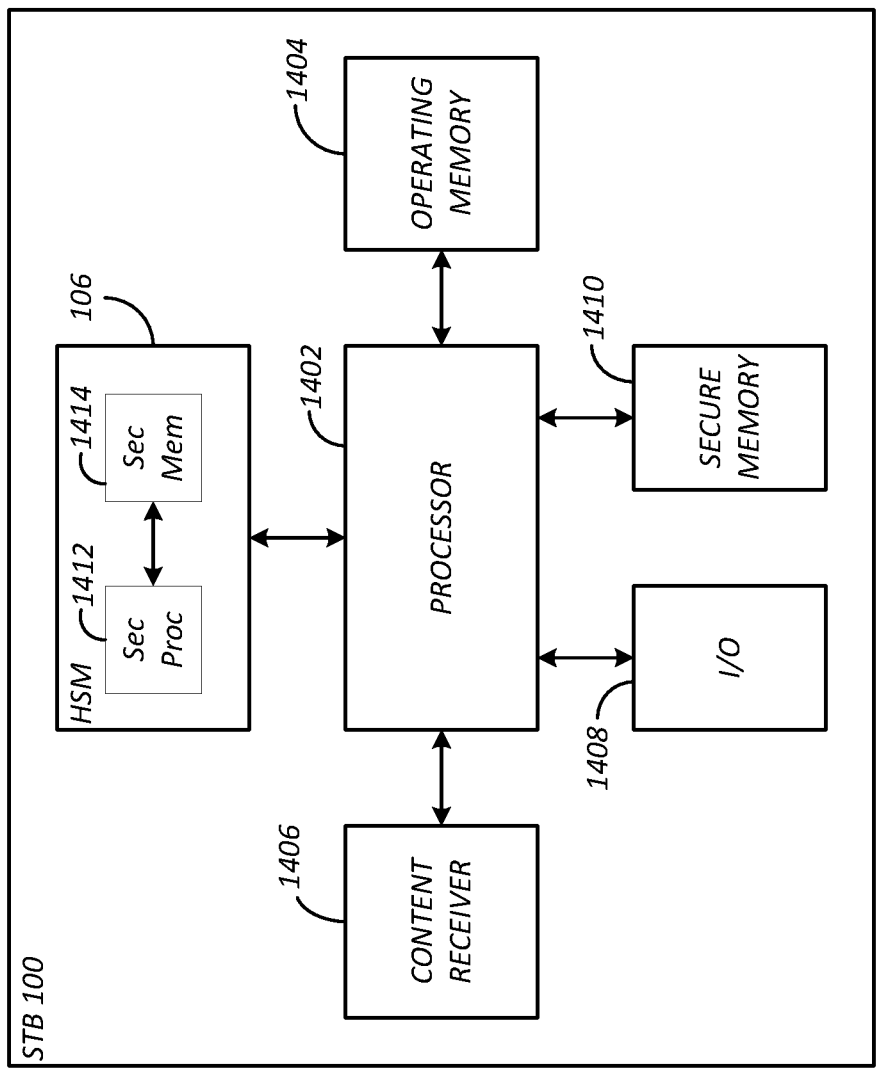
FIG. 14 is a diagram illustrating an exemplary set top box that could be used to implement elements of the present invention.

FIG. 14 is a diagram of an exemplary consumer electronics device such as the STB 100. The STB comprises the HSM 106, a processor 1402 communicatively coupled to an operating memory 1404, a secure memory 1410, an input/output interface 1408, and a content receiver 1406 such as a tuner. The processor 1402 executes operations stored in the operating memory 1404, at times, using data stored in the secure memory 102. The HSM 106 comprises an HSM secure processor 1412 and an HSM secure memory 1414. The HSM processor 1412 executes instructions stored in the secure memory 1414 to decrypt and/or encrypt data as described above. The HSM 106 may also comprise one or more other secure memories communicatively coupled to the secure processor 1412 (not pictured) for storing data used by the HSM to decrypt or encrypt data.

Data comprising content (e.g. video programs) is obtained by the content receiver 1406 and provided to the processor 1402 for processing. Such processing may include decrypting the content using confidential data stored in the secure memory or flash 102 as described above. The confidential data is retrieved by the processor 1402 and provided to the HSM 106 for decryption. As described above, the data returned from the HSM 106 may be encrypted so as to be decryptable using one or more whitebox decoding utilities stored in the operating memory 1404.

CONCLUSION

This concludes the description of the preferred embodiments of the present invention.

This description explains how whitebox cryptography can be used in an open software stack to prevent confidential data from being compromised by non-licensees. Ultimately, this method protects the licensees of the confidential data from possible litigation disputes. A desirable feature of an HSM (which facilitates implementation of the methods described herein) has been described in which content is re-encrypted with two distinct hardware keys with one call. Use of containers was detailed as a way to protect against unauthorized access of high confidential data by a non-licensee who is acting in a development capacity.

The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of securely providing video data for use in a consumer electronics device set top box for playing the video data, the consumer electronics device having a hardware security module (HSM) and a processor performing instructions defined in a software image, the method comprising:

receiving the data encrypted according to a global key, wherein the global key encrypts data encoded using a whitebox key, wherein the global key is created from combining a root global key with secret pairs;

further encrypting the data according to a device-unique hardware key;

storing the further encrypted data in a secure memory of the consumer electronics device;

providing the global key to a whitebox encoder for encoding according to a base key to generate a whitebox encoded global key; and transmitting the software image to the consumer electronics device for storage in an operating memory of the consumer electronics device, the software image having a whitebox decoder utility corresponding to the whitebox encoder and the whitebox encoded global key;

retrieving the stored encrypted data from the secure memory;

decrypting the data according to the device-unique hardware key using the HSM;

whitebox decoding the decrypted encrypted data using the whitebox decoding utility of the software image and the encoded global key; and
providing the decrypted data for use by the software image via an unexternalized software application program interface of the software image.

2. The method of claim 1, wherein:
the method further comprises:
when the received data is further encrypted according to a second global key;
decrypting the encrypted data using the second global key in the hardware security module.

3. The method of claim 2, wherein the encrypted data is received from a licensor.

4. The method of claim 3, wherein:
the encrypted data received from the licensor is further encrypted with the second global key according to the device-unique hardware key by the licensor.

5. The method of claim 1, wherein:
the received data comprises confidential data comprising a whitebox encoded consumer electronics device private key;
the whitebox encoded consumer electronics device private key is generated by:
providing the consumer electronics device private key to a second whitebox encoder for encoding according to a second base key;
transmitting the software image to the consumer electronics device for storage in an operating memory of the consumer electronics device, the software image having the whitebox decoder utility corresponding to the whitebox encoder and the whitebox encoded global key comprises:
transmitting the software image to the consumer electronics device for storage in an operating memory of the consumer electronics device, the software image having the whitebox decoder utility corresponding to the whitebox encoder and the whitebox encoded global key, and the whitebox encoded consumer electronics device private key.

6. The method of claim 5, wherein:
the method further comprises:
whitebox decoding the whitebox encoded global key;
decrypting the data according to the device-unique hardware key using the HSM to produce the data encrypted according to the global key; and
decrypting the data according to the whitebox decoded global key;
providing the decrypted data for use by the software image via an unexternalized software application program interface of the software image further comprises:
providing the whitebox encoded consumer electronics device private key.

7. The method of claim 6, further comprising:
performing cryptographic operations using the whitebox encoded consumer electronics device private key without exposing a clear version of the whitebox encoded consumer electronics device private key.

8. An apparatus for securely providing video data for use in a consumer electronics device set top box for playing the video data, the consumer electronics device having a hardware security module (HSM) and a processor performing instructions defined in a software image, comprising:
a processor;
a memory, communicatively coupled to the processor, the memory storing instructions for:
receiving the data encrypted according to a global key, wherein the global key is used to encrypt data encoded using a whitebox key, wherein the global key is created from combining a root global key with secret pairs;
further encrypting the data according to a device-unique hardware key;
storing the further encrypted data in a secure memory of the consumer electronics device;
providing the global key to a whitebox encoder for encoding according to a base key to generate a whitebox encoded global key; and
transmitting the software image to the consumer electronics device for storage in an operating memory of the consumer electronics device, the software image having a whitebox decoder utility corresponding to the whitebox encoder and the whitebox encoded global key
retrieving the stored further encrypted data from the secure memory;
decrypting the data according to the device-unique hardware key using the HSM;
whitebox decoding the decrypted encrypted data using the whitebox decoding utility of the software image and the whitebox-encoded global key; and
providing the decrypted data for use by the software image via an unexternalized software application program interface of the software image.

9. The apparatus of claim 8, wherein:
the processor instructions further comprise instructions for:
when the received data is further encrypted according to a second global key;
decrypting the encrypted data using the second global key in the hardware security module.

10. The apparatus of claim 9, wherein the encrypted data is received from a licensor.

11. The apparatus of claim 10, wherein:
the encrypted data received from the licensor is further encrypted with the second global key according to the hardware key by the licensor.

12. The apparatus of claim 8, wherein:
the received data comprises a whitebox encoded consumer electronics device private key;
the whitebox encoded consumer electronics device private key is generated by performing further instructions comprising instructions for:
providing the consumer electronics device private key to a second whitebox encoder for encoding according to a second base key;
the instructions for transmitting the software image to the consumer electronics device for storage in an operating memory of the consumer electronics device, the software image having the whitebox decoder utility corresponding to the whitebox encoder and the whitebox encoded global key comprises instructions for:
transmitting the software image to the consumer electronics device for storage in an operating memory of the consumer electronics device, the software image having the whitebox decoder utility corresponding to the whitebox encoder and the whitebox encoded global key, and the whitebox encoded consumer electronics device private key.

13. The apparatus of claim 12, wherein:
the instructions further comprise instructions for:
whitebox decoding the whitebox encoded global key;

decrypting the data according to the device-unique hardware key using the HSM to produce the data encrypted according to the global key; and decrypting the data according to the whitebox decoded global key; and the instructions for providing the decrypted data for use by the software image via an unexternalized software application program interface of the software image further comprise instructions for:

providing the whitebox encoded consumer electronics device private key.

14. The apparatus of claim 13, wherein the consumer electronics device performs cryptographic operations using the whitebox encoded consumer electronics device private key without exposing a clear version of the whitebox encoded consumer electronics device private key.

* * * * *